(12) United States Patent
Metz

(10) Patent No.: US 9,089,146 B2
(45) Date of Patent: Jul. 28, 2015

(54) DRYING CABINET

(76) Inventor: Michael Metz, Nurtingen (DE)

( * ) Notice: Subject to any disclaimer, the term of this patent is extended or adjusted under 35 U.S.C. 154(b) by 1072 days.

(21) Appl. No.: 12/598,582

(22) PCT Filed: Apr. 25, 2008

(86) PCT No.: PCT/EP2008/003377
§ 371 (c)(1),
(2), (4) Date: Jun. 6, 2011

(87) PCT Pub. No.: WO2008/135185
PCT Pub. Date: Nov. 13, 2008

(65) Prior Publication Data
US 2011/0236548 A1 Sep. 29, 2011

(30) Foreign Application Priority Data

May 4, 2007 (DE) .......................... 10 2007 021 366
May 30, 2007 (DE) .......................... 10 2007 025 288
Oct. 9, 2007 (DE) .......................... 10/2007 048 481

(51) Int. Cl.
A47J 39/00 (2006.01)
A22C 15/00 (2006.01)
A23B 4/03 (2006.01)
A21B 3/04 (2006.01)

(52) U.S. Cl.
CPC ................. *A22C 15/007* (2013.01); *A21B 3/04* (2013.01); *A23B 4/031* (2013.01); *A47J 39/003* (2013.01)

(58) Field of Classification Search
CPC .......... A23B 4/031; A23B 4/03; A23B 4/052; A47J 39/003; A21B 3/04
USPC ........... 99/476, 475, 474; 126/21 A; 219/400, 219/386, 392
See application file for complete search history.

(56) References Cited

U.S. PATENT DOCUMENTS

| 2,625,095 | A | * | 1/1953 | Julian | ............................. 99/476 |
| 3,747,513 | A | * | 7/1973 | Seelbach | .......................... 99/476 |
| 3,861,378 | A | * | 1/1975 | Rhoads et al. | .............. 126/21 A |
| 4,583,454 | A | * | 4/1986 | Huang et al. | .................... 99/468 |
| 4,587,946 | A | * | 5/1986 | Doyon et al. | ................... 126/20 |
| 4,750,276 | A | * | 6/1988 | Smith et al. | ..................... 34/612 |
| 4,760,779 | A | * | 8/1988 | Morris | ............................. 99/475 |
| 5,361,686 | A | * | 11/1994 | Koopman | .................. 99/421 H |
| 5,615,603 | A | * | 4/1997 | Polin | ............................... 99/331 |
| 6,182,374 | B1 | * | 2/2001 | Yen | .................................. 34/218 |
| 6,637,320 | B2 | * | 10/2003 | Grandi | ............................ 99/468 |
| 6,796,223 | B2 | * | 9/2004 | Jiang | ............................... 99/468 |

* cited by examiner

*Primary Examiner* — Reginald L Alexander
(74) *Attorney, Agent, or Firm* — Berliner & Associates

(57) ABSTRACT

The invention relates to a carriage, more particularly for drying and curing of raw sausage, said carriage being comprised of a frame (2), racks (3) arranged at said frame (2) to receive product to be dried and treated (4) as well as wheels (5) arranged at the base, at least one fan unit (6) with a first diffuser (8) as well as at least a second diffuser (9), if required, arranged at the carriage. The invention furthermore relates to a drying system comprised of a drying cabinet (10) as well as comprised at least of such a carriage (1).

5 Claims, 2 Drawing Sheets

Figure 2:
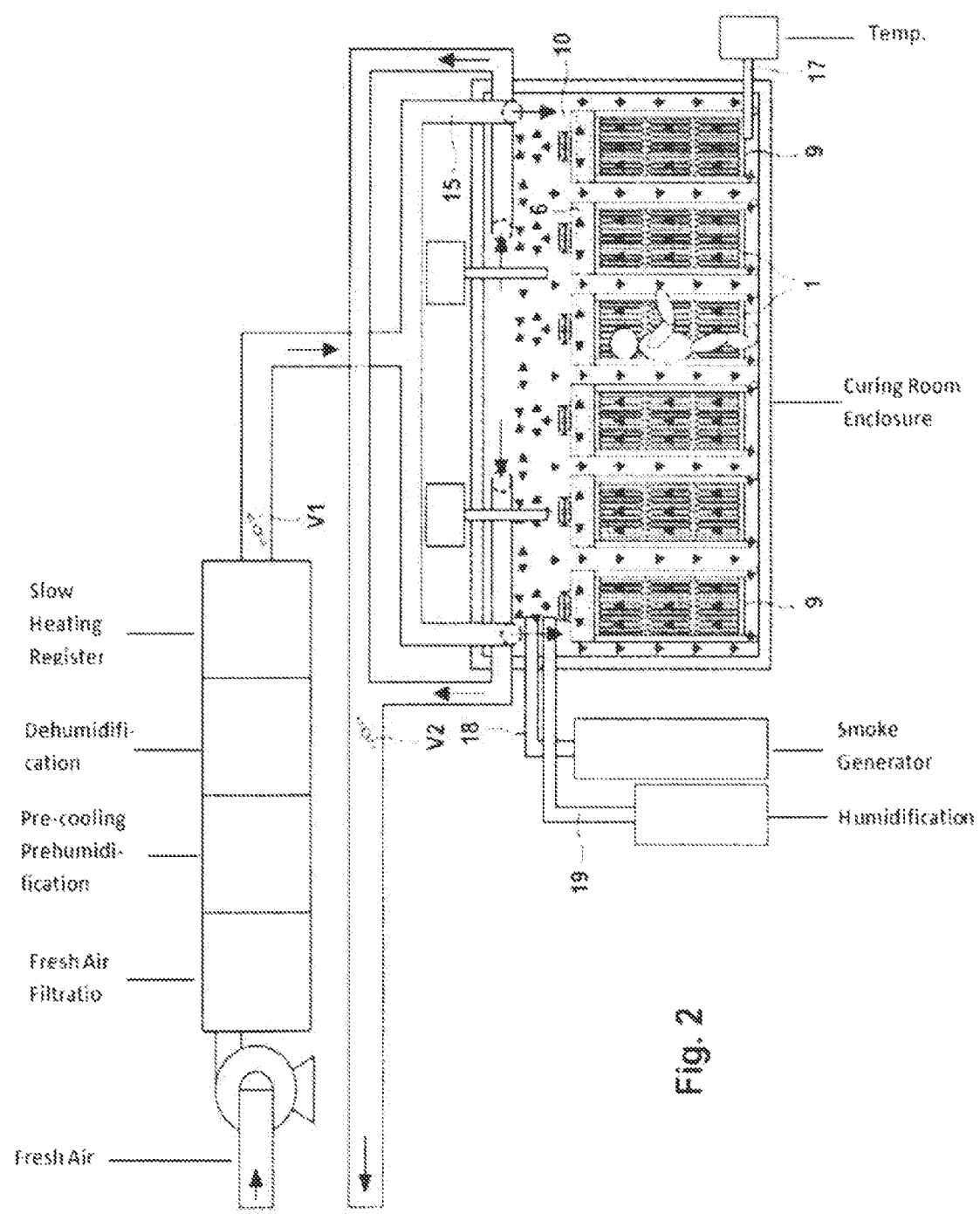

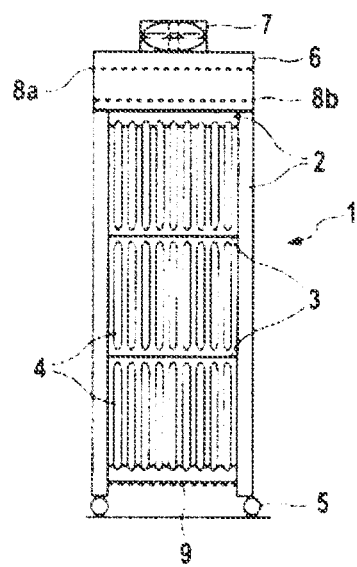
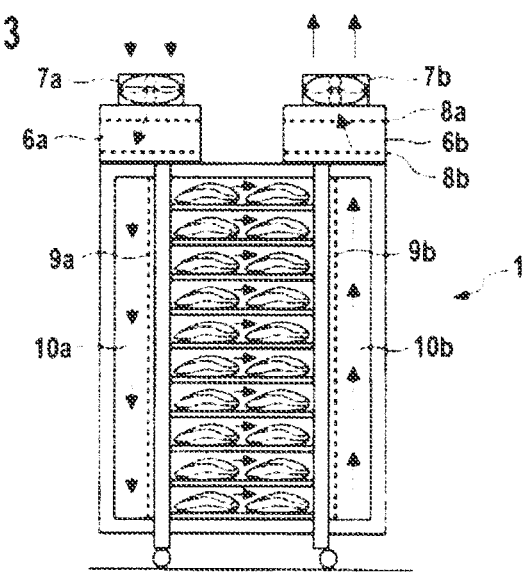

DRYING CABINET

The invention relates to a carriage comprised of a frame, racks arranged at the frame to receive product to be treated as well as wheels mounted at the base, said carriage being particularly suitable for drying and curing of foodstuffs such as raw sausage. The invention furthermore relates to a drying system comprised of a drying cabinet as well as comprised at least of such a drying carriage.

Drying facilities are applied in numerous variants in industrial technology. They attain particular importance in foodstuffs technology on production of dried foodstuffs and/or partially dried products. Further fields of application encompass drying of chemical, pharmaceutical, agricultural, textile products as well as wood. Examples to be mentioned for the foodstuffs sector are curing of raw sausage and cheese as well as drying and smoking of meat and fish.

On production of foodstuffs, particularly high requirements are laid to drying processes in terms of hygienic conditions and homogeneity of drying. On the one hand, drying serves for preservation—dried products offer a multiple in durability than fresh products—as well as for conditioning and curing of meats, for example. In the following, the present invention is described in relation to the curing of raw sausage. But it may also be utilized and implemented for other agricultural products, for example for drying of herbs and fruit.

In meat industry, drying processes are predominantly implemented and used for production of high-grade ham and sausage products. The crucial factor that matters here is a very even extraction of moisture which is not allowed to exceed a certain degree. Raw sausages and ham products, in particular, require a defined residual water content to develop optimal flavor. In many instances, drying is simultaneously linked to aromatizing, for example by introduced smoke.

For drying, more particularly for drying of sausages and meats, drying cabinets are frequently used into which dehydrated and possibly filtrated fresh air is blown-in whereas moist process air is discharged. In general, these drying conditions are diligently checked and controlled in terms of moisture content of fresh air/process air as well as in terms of the temperature prevailing in the drying cabinet. In general, part of the process air is conducted in circulation. To this effect, make-up air is admixed to process air and together with fresh air it streams again through the air treatment system.

Conventional drying cabinets basically avail of a relatively inhomogenous air flow entailing uneven dehydration of products to be dried. In the field of fresh air supply, in particular, and in the field of process air exhaust suction, streams are strong and take a turbulent course. Conversely, in quite a lot of other areas of drying cabinets, air streams are rather moderate, thus leading to a low transition of water, too. Consequently, the drying of products is very uneven. This inhomogeneity may involve that products drying too fast develop so-called drying margins whereas other products still have too high a moisture content at the end of the drying cycle. In general, drying periods are long and associated with high consumption of energy, because the drying capacity of drying air is only exploited to a little extent.

DE 10 2005 040 481 discloses a drying system in which the drying cabinet is subdivided into a drying zone and into one or several separate feedback zones for process air and wherein a diffuser to dissipate drying air is arranged above the drying zone. At least in their bottom area, the feedback zones are connected to the drying zone. Process air is fed back to the diffuser.

For curing in drying cabinets, the product to be treated is moved-in as a product suspended in drying carriages and left there for the necessary time. Such drying carriages are open at all sides, they are movable and comprise at least one hung-in suspending rack which the product to be dried is hung to. The drying carriages are open at all sides, so that conditioned air may enter and can approach the product to be dried. However, the supply of drying air to the product to be dried is inevitably uneven in all prior art drying cabinets. The product to be dried and hung to the margins of the drying carriage is more strongly charged with air than the product to be dried hanging in the interior. Moreover, substantial flow differences as outlined hereinabove are entailed in various zones of the drying cabinet, for example with a strong air stream in the area of the air inlet and outlet and with a weak stream in the corner areas or in those areas situated far away from the supply of fresh air.

Now, therefore, it is the object of the present invention to optimize prior art drying methods and devices in such a manner that a quick and even drying of products to be dried can be achieved. This does not only apply to foodstuffs but to all kinds of hydrous substrates to be dried.

This task is solved by a carriage, more particularly a drying carriage of the kind mentioned hereinabove, said carriage being provided with at least one fan unit and at least one diffuser. The carriage may comprise a second diffuser which is then arranged at the carriage side lying opposite to the first diffuser. An even supply of air to the product to be dried is achieved in this manner.

In the following, the invention is described more particularly by the example of a drying carriage and a drying cabinet.

As a rule, the inventive drying carriage will be comprised of an individual fan hood and a diffuser allocated to it, both of which being arranged at the upper side of the carriage, as well as comprised of a second diffuser at the carriage base so that drying air can stream in vertical direction through the carriage with the product to be dried. A second diffuser can be dispensed with in particular, if the racks or trays installed in the carriage permit an even and directional air flow.

As an alternative, the carriage may also comprise lateral air channels that are linked through second diffusers to the carriage interior. In this case, the carriage may be provided with a single fan hood which charges air to a channel, but it may also be comprised of two fan hoods, i.e. one hood for each channel, thereof one controlling the supply of air and the other one regulating the effluent air. In particular, each fan hood is comprised of a first diffuser that homogenizes the air flow.

It is self-evident that the fan unit or several fan units may also be arranged at those carriage sides which cater for a horizontal air flow through the product to be treated. For treatable products arranged in horizontal position, this is of particular advantage. In this case, the diffusers are also arranged laterally at the carriage at opposite sides.

Such an inventive drying carriage is individually or in plurality gently pushed into a conventional drying cabinet and there it is not directly exposed to drying air but individually charged with drying air via a fan and diffuser system of its own. An individual supply of drying air allows for even drying of the product to be dried in all areas of the drying cabinet, i.e. it largely eliminates the influence of cabinet geometry as well as inhomogeniety in the flow of air. Furthermore, since the drying carriages are equipped with fan units, the flow of air to each carriage can be adjusted and set individually, thus allowing for an individual adaptation to each product to be dried. In other words, carriages holding different products to be dried and calling for different treatment conditions can be handled and treated simultaneously in the drying cabinet. It is self-evident that this applies accordingly to smoking, curing, air-conditioning and other forms of conditioning cabinets and carriages.

The inventive drying carriage is comprised of a conventional frame, for example of a profiled frame, preferably of stainless steel hollow profiles that are easy to clean, into which suspending racks to receive the product to be dried are hung-in. The product to be dried is expediently hung to the suspending racks. For ease of handling, the carriage may be equipped with wheels.

It is self-evident that the suspending racks may also be configured as checkered grates on which the product to be dried comes to rest. In this case, it makes sense to provide for a lateral supply of drying air.

On its upper side, the carriage comprises a fan hood which apart from a fan contains a first diffuser. The diffuser is preferably comprised of one or several perforated plates, with it being possible for the holes of several perforated plates to be spaced at gaps or being in flush alignment to each other. If the spacing and the flow velocity have been correctly adjusted and set, it is possible to generate a largely laminar (low-turbulence, unidirectional and even) streaming within the drying carriage. Whirling of the stream required for transition of moisture is in any way accomplished at the boundary area towards the product to be dried.

It is self-evident that the fan can both aspirate air from the bottom through the product to be dried and dissipate air to the bottom onto the product to be dried.

With a distinct product to be dried which on account of its shape or volume is recommended to be stored horizontally on grates, it might be expedient to conduct the air laterally through the drying carriage. In this case, the drying carriage at opposite sides is equipped with air channels, thereof one being supplied with drying air via the fan hood and the other one serving for discharge of used drying air. This second channel, too, may be equipped with a fan that extracts effluent air. Both channels are linked via perforated holes from second diffusers to the interior of the carriage. The two add-on fan attachments or hoods preferably also have first diffusers to homogenize the stream of air. This homogenization can also be achieved by a lateral arrangement of fan units.

To adjust and set the streaming optimally, it is required to prevent inflow of air from the sides. For example, this can be accomplished by wrapping the drying carriage with a foil all around. Expediently it is a stretchable foil. Using a foil bears the advantage in that upon completion of the drying procedure the number of parts to be cleaned is kept low; the foil is easy to dispose of.

Alternatively, it is also possible to provide the carriage with walls and/or doors that are expediently removable to allow for easy cleaning of component parts.

The base area of the drying carriage is comprised of a second diffuser, if required, which expediently comprises one perforated plate only. If air is conducted horizontally, the diffusers are arranged at the opposite sides of the drying carriage.

It is self-evident that the fan units are detachable to allow for repair, maintenance and cleaning. In accordance with a special embodiment, the carriage and the fan unit are arranged separately from each other in such a manner that the fan hood is so installed in a drying cabinet that a carriage charged with a product to be dried can be gently pushed under the hood for drying of the product in order to thus establish a functional unit comprised of hood and carriage.

In addition to the fan unit, the inventive carriages may be equipped with a heating and/or cooling register. For example, this allows for tempering the product to be cured, defrosting of cooled products, a controlled cooling down of foodstuffs, for example for the production of cold cuts of various sausages or for freezing of foodstuffs. In the laminar (unidirectional) stream of air which is ensured by the fan units with the diffusers, a very good (even) and quick transition of heat occurs so that warming-up and/or cooling down are quickly accomplished.

In this case, the fan unit and the heating and/or cooling registers for this purpose are arranged at opposite sides of the carriage. The fan unit aspirates air through the carriage which has been tempered before in the heating and/or cooling register. In general, however, the cooling and heating registers will have to be arranged in a room.

Furthermore, the inventive carriages may comprise distribution units for water or conditioning agents, for example for moistening the product to be treated, for supplying the product to be treated with smoking blends and/or mixed spices, curing cultures, spices and/or antibiotics such as Natamycine. For example, a distribution facility of this kind may inject water or conditioning agents into the air stream distributed by the fan unit. Here, too, the distribution units may be arranged in the room where conditioning is accomplished, or in the channels for air supply, too.

It is self-evident that the inventive carriages avail of a programmable control unit that allows for individual adjustment to the goods to be treated. In particular, this relates to the intensity and duration of charging air to the good to be treated, control of air humidity, charging with conditioning agents, etc. The control can be made dependent upon distinct parameters, for example on the core temperature and/or moisture content of a product to be treated, on the temperature or moisture content of effluent air or even on a temperature gradient within the product to be treated. The control is accomplished via sensors arranged in the product to be treated or at suitable locations of the carriage.

An exemplary control is described in the following:

The drying carriage evidences a laminated stream flow. The condition of the air at the entrance into the carriage is determined via a suitable measuring device. Via a measuring transducer, the absolute moisture content of air is determined in grams of water per liter or kilograms of air. While passing through the carriage and through the product to be dried, air absorbs water. A measuring device identical to the one installed at the air entrance is installed at the air exit from the carriage. It also measures the condition of air and likewise it calculates the absolute moisture content of air in grams of water per kilograms of air. By subtracting the inlet moisture content from the outlet moisture content, it results delta x. The term delta x expresses how much water has been absorbed by air during its passage through the carriage and it represents a direct measure for drying intensity. Via the plant control unit, the delta x value can be exactly controlled and regulated through a variation of the amount of recirculating air in the carriage (dissolving air) as well as the condition of air and the volumetric flow of air blown into the cabinet (transport air).

This controlling strategy can be implemented as one strategy of several control strategies for the drying process.

A similar prior art control is also feasible by applying the principle of gravimetry. To this effect, a reference carriage stands on a scale that continuously measures the carriage weight decrease due to condensation of water. The decrease in weight per time, too, is a variable that can be applied to directly determine the drying intensity and it is well known as a controlling parameter.

Finally the invention relates to a drying system comprised of a drying cabinet with a fresh air feeder, facilities integrated into the fresh air feeder for conditioning of fresh air, a process air discharge, facilities, if required, for forcible circulation of process air in the drying cabinet as well as monitoring and controlling facilities for control and regulation of air streams, moisture, and temperature in combination with at least one drying carriage as described hereinabove. For example, a suitable drying cabinet is described in patent application DE 10 2005 040 481. Besides, a drying cabinet of this kind may comprise one or several pre-installed fan hoods under which the carriages with the product to be dried can be gently pushed. The hoods can also be arranged side by side in a row so that they can be utilized like a continuous-flow dryer. For this purpose, the individual carriages may pass through under the hoods. Furthermore it is self-evident that a "drying carriage" in the sense of the invention also is a rack with a fan hood set-up in a drying cabinet and operated in accordance with the present invention.

For the production of smoked goods, the drying cabinet can be provided with a smoke inlet. To finely regulate the moisture to avoid drying damage, a moisture inlet may also be provided for. Finally, the drying cabinet may also be provided with heating facilities to control temperature. It is self-evident that in the inventive drying system the cabinet comprises electrical connections for connection of the fans of the drying carriages as well as pre-installed fan hoods, if required.

The invention is explained and outlined in greater detail by way of the attached illustrations, wherein:

FIG. 1 is a principle sketch of an inventive drying carriage with an add-on fan hood, FIG. 2 is a principle sketch of an inventive drying system, FIG. 3 is a principle sketch of another embodiment of a drying carriage.

FIG. 1 shows an inventive drying carriage 1 comprised of racks 3 with hung-in raw sausages 4 and suspended into an outer frame composed of hollow profiles 2. For example, the frame is comprised of stainless steel hollow profiles having a quadratic cross-section and comprised of devices arranged at several levels to accommodate the suspended racks 3. The suspended racks 3, for example, are comprised of grates into which the goods to be dried are hung-in. At the base, the drying carriage 1 is equipped with wheels 5 as well as a perforated plate 9 which serves as a second diffuser.

A fan hood 6 mounted at the upper end of the drying carriage 1 is equipped with an add-on fan 7 and a stream flow box located underneath and accommodating two perforated plates 8a and 8b arranged at a certain spacing from each other. In the drawn arrangement, the holes of perforated plates 8a and 8b are spaced at a gap; but an arrangement in which the holes are in flush alignment to each other is also feasible.

For operation, the drying carriage 1 shown here is wrapped with a stretching foil after having been loaded with goods to be dried so that the entry of air from the sides is blocked. During the drying phase, the drying air is then pressed or sucked via the fan 7 into the drying carriage, i.e. the air stream reaches the goods to be dried either via the first diffuser 8 or via the second diffuser 9 mounted at the base.

It is self-evident, e.g. for reasons of sterility, that the fan hood 6 can be equipped with a filter unit. Additionally, such a filter may also be arranged at the base.

FIG. 2 schematically shows an inventive drying system comprised of a drying cabinet 10 and a drying carriage°1 arranged therein.

The drying cabinet 10, which may also be termed as curing compartment, receives its fresh air through the feed air path and a fan in filtrated status via a primary cooler, a dehydrator and via a steam heating register. A valve V1 regulates the inflow. Fresh drying air is blown into the upper area of the curing compartment via injection nozzles 15 and thus it streams into the area of the drying carriages 1. The drying carriages 1 aspirate the drying air through the second diffuser 9 at the base of the drying carriages. Drying air streams past the goods to be dried to the fan hood 6 where it is dissipated to the curing compartment. Consumed air is withdrawn via the effluent air duct and valve V2 and admixed to the feed air, if possible.

Moisture and temperature in the curing compartment are measured via moisture and temperature measuring sensors and adjusted on conditioning of inflow air. A heating facility 17 assists in controlling the temperature in the cabinet, especially in the cooler area at the bottom. On demand, moisture can be charged to the cabinet via the feeder duct 19 whereas smoke can be added via feeder duct 18.

FIG. 3 shows another variant of the inventive drying carriage, in which carriage 1 is laterally charged with drying air. Drying air is conducted by means of a fan 7a through the fan hood 6a and perforated plates arranged therein into a distribution channel 10a which in turn is linked via a second diffuser 9a to the goods to be dried in carriage 1. Drying air streams through the carriage and enters through another second diffuser 9b into the effluent air channel 10b in order to be discharged via fan hood 6b through a first diffuser facility and fan 7b. The arrows indicate the direction of flow.

A lateral feed of drying air through air ducts arranged on opposite sides may be purposive for horizontally stored meat goods such as hams but also for other goods to be dried and stored horizontally.

As an alternative, the horizontal air flow can also be generated by a fan facility with diffusers arranged laterally at the carriage.

The drying carriage according to this variant can be locked by means of doors at both remaining sides, but it can also be wrapped with a foil and be sealed in the manner described hereinabove.

The invention claimed is:

1. A carriage for drying and curing of raw sausage having a base, said carriage being comprised of frame (2), racks (3) arranged at said frame (2) to receive product to be dried and treated (4) as well as wheels (5) arranged at the base, characterized by being a structure having no side walls or doors and comprising a fan hood (6), a first diffuser (8) arranged at the carriage top and a second diffuser (9) arranged at the carriage floor, the first diffuser being comprised of two perforated plates (8a, 8b) distanced from each other so as to provide laminar air flow, the apertures of which are separated at a gap, the diffusers providing an air flow in a vertical direction, the carriage being designed for being wrapped by a film in operation.

2. Carriage according to claim 1, characterized in that said frame (2) is a hollow profile frame.

3. Carriage according to claim 1, characterized by an additional heating and/or cooling register.

4. Carriage according to claim 3, characterized in that the fan unit (6) is arranged at the carriage side lying opposite to the heating and/or cooling register.

5. Carriage according to any of the preceding claims, characterized by a distribution facility tor water and/or conditioning agents.

* * * * *